Sept. 17, 1963  J. RABINOW ET AL  3,103,999
OVERLOAD CLUTCH
Filed Sept. 20, 1960  3 Sheets-Sheet 1
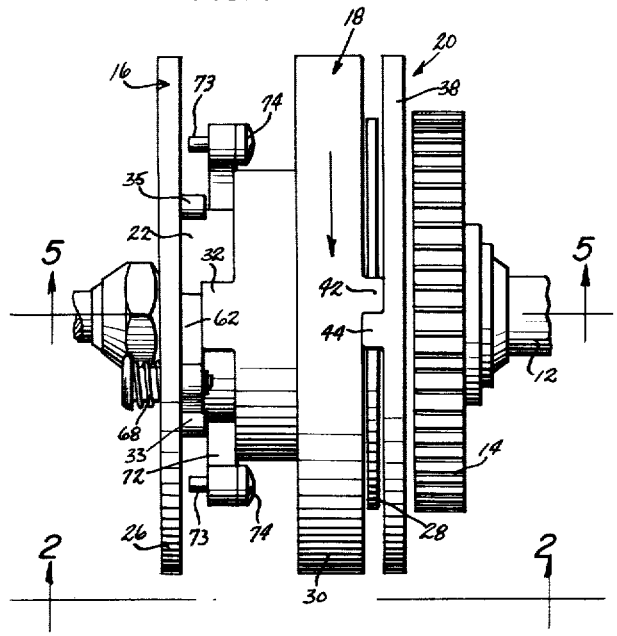
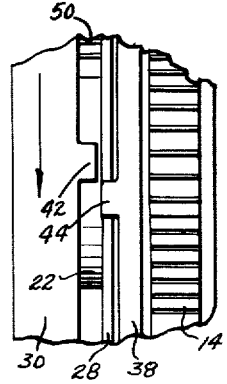
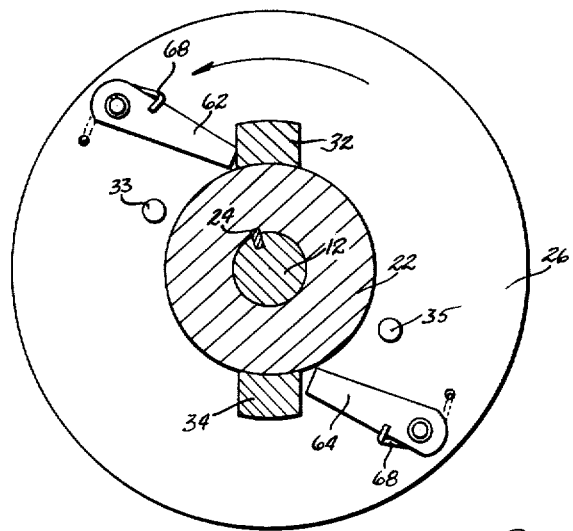
Jacob Rabinow
Harold J. Rosenberg
INVENTORS
BY Joseph A. Genovese
ATTORNEY

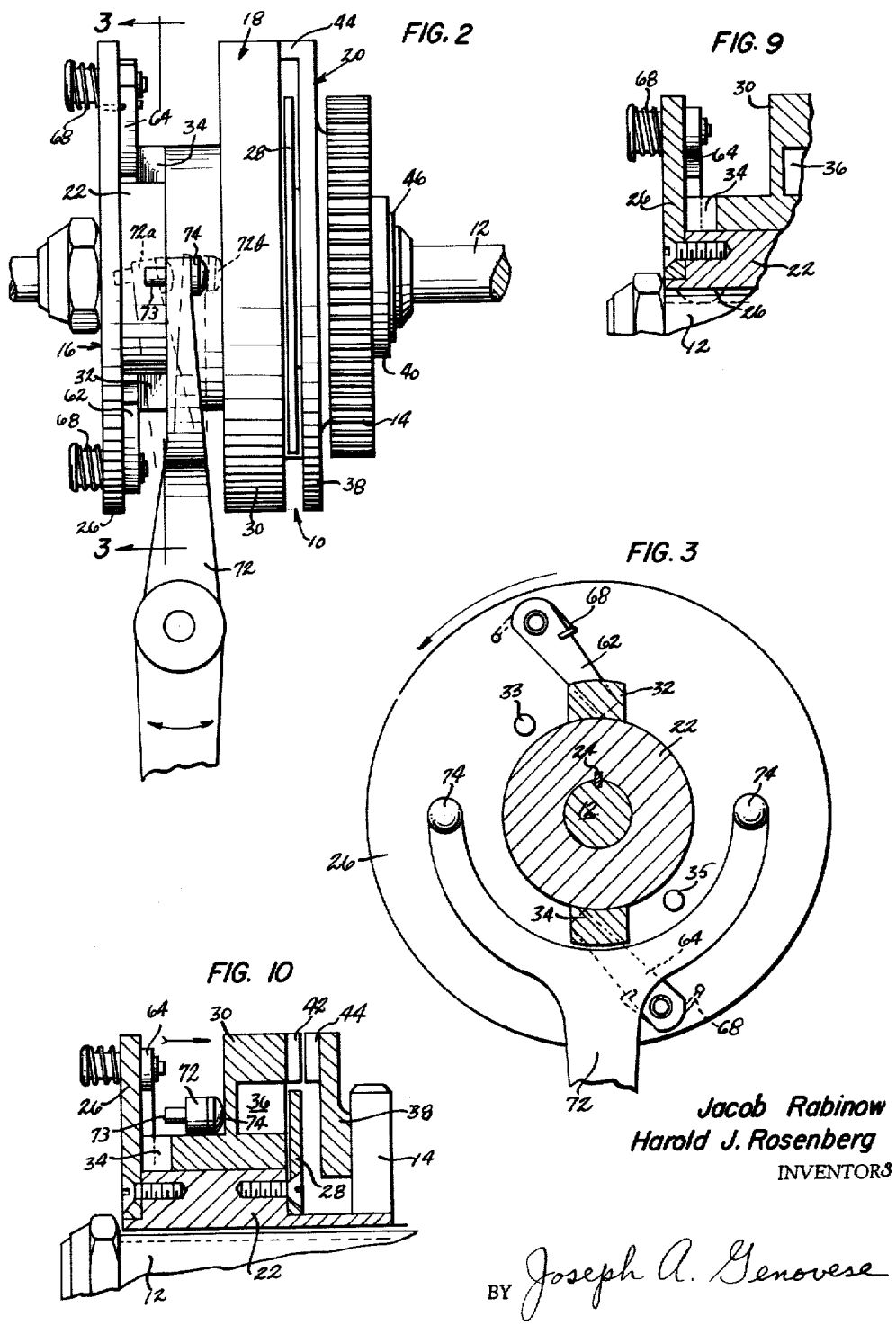

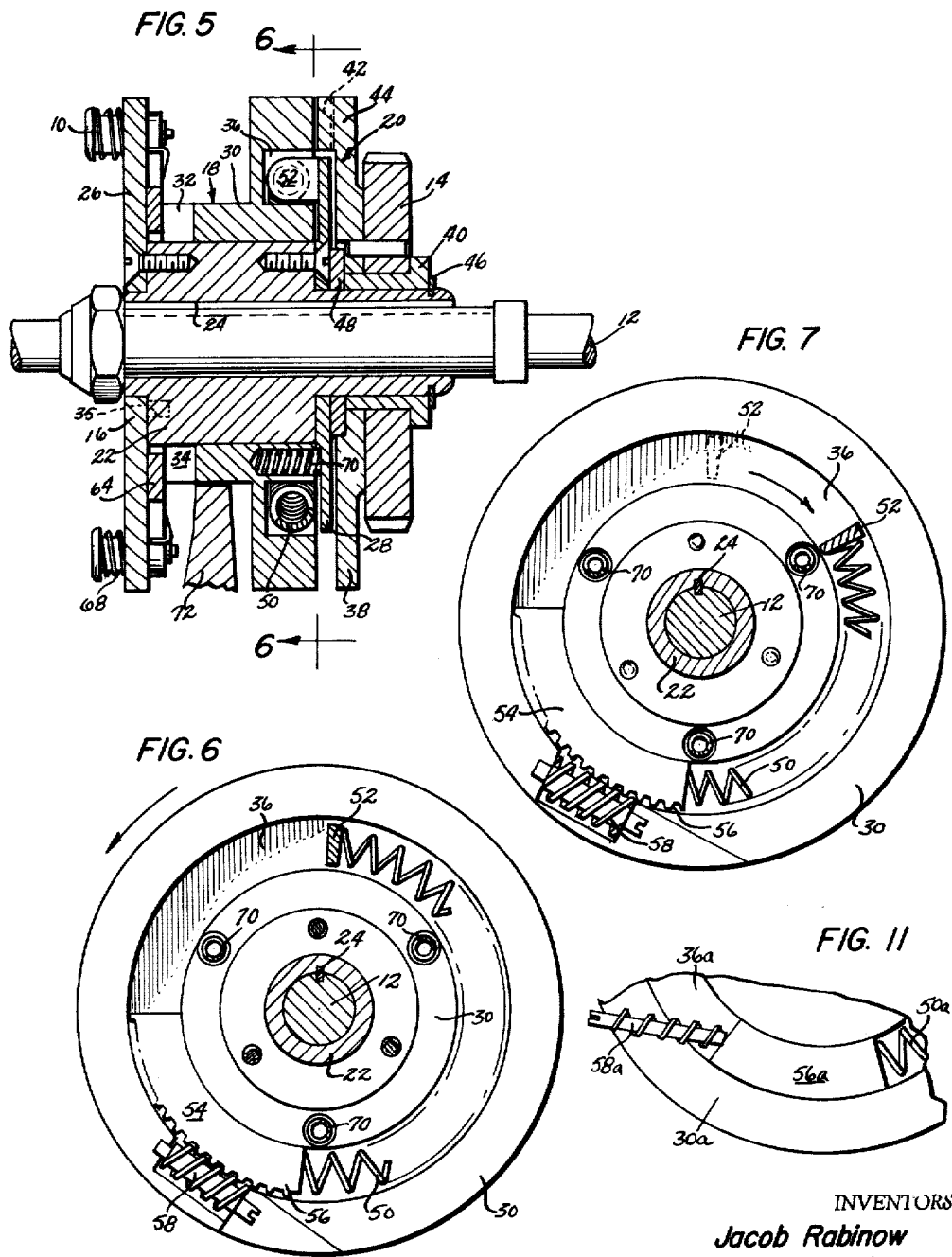

United States Patent Office 3,103,999
Patented Sept. 17, 1963

3,103,999
OVERLOAD CLUTCH
Jacob Rabinow, Takoma Park, and Harold J. Rosenberg, Silver Spring, Md., assignors, by direct and mesne assignments, to Rabinow Engineering Co., Inc., Rockville, Md., a corporation of Maryland
Filed Sept. 20, 1960, Ser. No. 57,207
11 Claims. (Cl. 192—56)

This invention relates to couplings and particularly to synchronizing overrunning clutches.

Both overrunning and synchronizing clutches have been used for many years, an example of an overrunning clutch being Patent No. 2,633,949, while a synchronizing clutch is disclosed in Patent No. 2,633,955. Clutches with special features are numerous, e.g. Patent No. 2,777,552 describing a clutch with controlled acceleration, and Patent No. 2,939,561 featuring a clutch with resilient torque transmission. To the extent that our clutch is overrunning and synchronous, it achieves the same result as prior analogous clutches. Our clutch has special features somewhat like earlier disclosures such as an adjustable spring to transmit torque so as to have controlled acceleration and resilient transmission of torque. However, our clutch is simpler, more compact and more versatile than any prior analogous clutch of which we are aware.

A typical clutch exemplifying the principles of our invention has a power train consisting of three members (actually sub-assemblies but called members for convenience) namely; a power input, an intermediate and a power output member. A spring couples the power input with the intermediate member. Our clutch is synchronous by having only one tooth respectively on the power output member and the intermediate member.

The intermediate member functions in a manner thought to be unique. In the driving position it is held by one or more interposers in an axial position at which the clutch teeth are engaged. Upon clutch overload the spring, functioning as a torque sensing device, yields allowing relative rotation between the power output and the power input members. Since the power input member is the physical support for the interposers, they rotate with respect to the intermediate member, permitting the intermediate member to slide axially to a position at which the clutch teeth become disengaged.

The clutch remains disengaged until manually reset. During the clutch engaging procedure, the spring is again used, but this time as a shock absorber enabling the clutch to be safely engaged under usual power without developing intolerable strain in the teeth.

Accordingly, an object of the invention is to provide an overrunning clutch with a mechanically simple action for overload disengagement.

Another object of the invention is to provide an overrunning clutch of the kind previously discussed, with means to adjust the preload of the spring so that a single size of clutch may be used within a wide range of overload torque requirements.

A further object of the invention is to provide an overrunning and synchronizing clutch with adjacent and/or remote means for resetting the clutch without having to slow or stop the drive line or clutch, and without overstressing the clutch teeth.

Features of our invention are that our clutch can be driven from either end with equal results, and that it may be mounted in various way such as at the end of a shaft or on a through shaft. These features enhance the multipurpose nature of our invention, whereas prior clutches with special features such as described in Patent Nos. 2,777552 and 2,939,561 are special purpose clutches.

Other objects and features will become evident in following the description of the illustrated clutch.

FIGURE 1 is a side view of a clutch exemplifying the invention.

FIGURE 2 is an elevational view taken along the line 2—2 of FIGURE 1.

FIGURE 3 is a sectional view taken on the line 3—3 of FIGURE 2 showing the position of the interposers when the clutch is engaged.

FIGURE 4 is a sectional view similar to FIGURE 3 but showing the interposer position when the clutch has just been disengaged.

FIGURE 5 is a sectional view taken on the line 5—5 of FIGURE 1.

FIGURE 6 is a sectional view taken on the line 6—6 of FIGURE 5 showing the preload spring as it appears when the clutch is engaged and driving.

FIGURE 7 is a sectional view similar to FIGURE 6 showing the preload spring compressed during overload of the clutch.

FIGURE 8 is a fragmentary elevational view showing the separation of the clutch teeth in the clutch disengaged condition.

FIGURE 9 is a fragmentary sectional view showing the direction of movement of the intermediate part of the clutch when the clutch is being disengaged.

FIGURE 10 is a fragmentary sectional view showing the movement of the same clutch part as in FIGURE 9, but when the clutch is being manually engaged.

FIGURE 11 is a fragmentary sectional view showing a modification of the means to adjust the spring preload in our clutch.

Clutch 10, exemplifying the invention, is a general purpose overrunning clutch. The power input means are shown as a shaft 12, and the power output means are shown as a gear 14, although any suitable means serving the same purposes may be selected. For initial discussion, clutch 10 may be considered as having a first or drive member 16, a second or intermediate member 18, and a third or driven member 20 (FIGURES 1, 2 and 5).

The drive member is made of a sleeve 22 secured on shaft 12, as by key 24, and having parallel spaced walls 26 and 28 fixed thereto. Intermediate member 18 consists of a hollow runner 30 mounted for rotation on sleeve 22 between walls 26 and 28. The runner is axially movable on sleeve 22 and has stops 32 and 34 (FIGURES 3, 4 and 5) at one end. The other end has an annular groove 36 (FIGURES 6, 7 and 11) opening through the face thereof. Driven member 20 is composed of a disc 38 concentric with shaft 12 and located on a bushing 40 carried by a reduced part of sleeve 22. Two coupling elements for instance teeth 42 and 44 (FIGURES 1, 5 and 8) are fixed to runner 30 and disc 38 respectively.

The power output gear is mounted on bushing 40 and keyed to disc 38. The bushing is held in place on sleeve 22 by lock ring 46 and thrust bearing 48. However, this illustration is selected only because the clutch has been successfully tested with such a configuration. Wide variance in this construction is obviously possible.

Drive member 16 is coupled to intermediate member 18 by a yielding means, such as spring 50 in groove 36 (FIGURES 5, 6 and 7). One end of spring 50 seats on an abutment 52 secured to intermediate member wall 28, and the other end of the spring bears against abutment 54. The abutment 54 is adjustably secured to runner 30 of intermediate member 18, and the adjustment may be obtained in several ways, two of which are shown. FIGURES 6 and 7 show sector 56 in groove 36, engaged by a worm 58 held captive in a pocket in runner 30. FIGURE 11 discloses an abutment block 56a in groove 36a, together with an adjustment screw 58a threaded in runner 30a and engaging block 56a. The preload on spring 50 or 50a is adjustable by turning worm 58 or screw 58a.

Runner 30 has been described as axially movable on sleeve 22. Interposers 62 and 64 (FIGURES 2, 3 and 4) are pivoted to the inner face of wall 26 and seat behind stops 32 and 34 (FIGURES 2, 3 and 5) to hold runner 30 in a position at which teeth 42 and 44 engage. Torsion springs 68 on the interposer pivots have their ends attached to wall 26 and the interposers, to bias them to the position behind the faces of stops 32 and 34 as shown in FIGURE 3.

When the interposers are pivotally moved or they otherwise become displaced from behind the faces of stops 32 and 34, means become effective to axially slide member 18 toward wall 26. This separates teeth 42 and 44 to disengage the clutch. The intermediate member sliding means are preferably springs 70 in wells within runner 30 and bearing against wall 28 of drive member 16.

The clutch is reset mechanically by axially sliding the intermediate member 18 away from member 16 and toward member 20 (see the arrow in FIGURE 10). This can be accomplished by a fork 72 which straddles runner 30 and which has headed pins 74 at one end. The fork may be actuated manually or by remote or adjacent electromechanical means (not shown) which are common in many arts.

Operation

Assume that clutch 10 is in the engaged position (FIGURES 1, 2, 3, 5 and 6). Power is transmitted from shaft 12 to member 16, and from member 16 to runner 30 of member 18 by way of spring 50 and its abutments 52 and 54. Teeth 42 and 44 are engaged by runner 30 being held to the right (with reference to FIGURE 5) by interposers 62 and 64. Therefore, member 18 drives member 20 to which the power output means 14 are secured.

Now assume an overload which means that the output 14 offers a greater resistance to turning than a preselected tolerable resistance offered by spring 50. Member 16 continues to rotate but driven member 20 (a) rotates at a slower speed or (b) does not rotate at all. The result is that spring 50 compresses (FIGURE 7) so that there is relative rotation between members 16 and 18. Note that the preload of spring 50 (by adjustment of worm 58 or screw 58a) determines the torque at which there will be significant relative rotation between members 16 and 18. This relative rotation (FIGURE 4) causes the interposers 62 and 64 to become displaced from the faces of stops 32 and 34 and allows springs 70 to axially move runner 30 (FIGURE 9) until the faces of stops 32 and 34 bear against wall 26. The clearances are such that when the runner 30 is in this axial position, teeth 42 and 44 are disengaged (FIGURE 8), and the clutch overruns.

The next possibility is that clutch 10 is operating without overload occurring, but it is desired to manually disengage the clutch while power continues to be applied to the clutch. Fork 72 is moved from the rest position to the dotted line position 72a (FIGURE 2) so that the ends 73 of pins 74 move into the path of travel of the interposers as the interposers rotate bodily with wall 26 of drive member 16. The interposers strike pins 74, causing the interposers to pivotally move from behind the faces of stops 32 and 34, allowing springs 70 to axially slide member 18 to the clutch disengaged position (FIGURES 9 and 8).

The final operational procedure is engaging the teeth 42 and 44 of the clutch, regardless of whether the clutch has been disengaged manually or by overload and whether the clutch is under power or not. Upon disengagement of the clutch, spring 50 back biases member 18 in accordance with the force of the spring. Fork 72 is pivoted to the position 72b (FIGURES 2 and 10), pressing the heads of pins 74 against a face of runner 30 with sufficient force to axially move intermediate member 18 against the yielding opposition of springs 70. This allows springs 68 to swing interposers 62 and 64 behind stops 32 and 34 so that they hold runner 30 in an axial position at which teeth 42 and 44 are engaged.

The action of spring 50, during clutch engagement, permits the clutch to be engaged at full normal input power of shaft 12. When the clutch is disengaged, preloaded spring 50 extends to its limit established by rotation between members 16 and 18 until the stops 32 and 34 engage stop pins 33 and 35 on wall 26. Then, as the member 18 is axially moved while it is rotating and member 20 is at rest, the teeth 42 and 44 engage. However, spring 50 is extended at the instant of teeth engagement, and it gradually compresses upon torque increase across members 16 and 18. The action of the spring (upon engagement of the teeth) is that it is first compressed and then it extends to its driving condition (FIGURE 6) as the driven member 20 comes up to speed, thereby attenuating the stressing of teeth 42 and 44 as they begin to drive. The relative positions of the interposers 62, 64 and stops 32, 34 are such that the springs 68 pivot the interposers behind the faces of stops 32 and 34 (FIGURE 3) when member 18 is axially moved in a direction to engage the teeth. Hence, the clutch is engaged and prepared to transmit power until overloaded or manually disengaged as described previously.

The duties of the power input means 12 and power output means 14 may be exchanged without any structural change in clutch 10. Upon clutch disengagement, means 14 would be driven and free turning while member 16 and shaft 12 would be stopped. In such an installation, the member 18 would be the "drive" member, and member 16 the "driven" member. Thus, the terms "drive" and "driven" are not to be construed as absolute, but rather as relative terms selected merely to facilitate understanding of the clutch.

All changes and modifications of the clutch shown and described as one possible way of practicing the invention, and which fall within the scope of the claims may be resorted to without departing from the protection thereof. For example, spring 50 is a compression spring, but the clutch may easily and obviously be designed with the spring 50 being a torsion or tension spring.

We claim:

1. An overrunning clutch comprising a first rotary member, an intermediate member mounted for rotation and axial movement on said first member, a third rotary member, teeth on said intermediate member and said third member respectively, resilient means axially urging said intermediate member to an axial position such that said teeth are disengaged, means opposing the force of said resilient means and including an interposer engaging said first member and said intermediate member to hold said intermediate member at an axial position which requires said teeth to be engaged, spring means drivingly connecting said first member and said intermediate member so that said spring means yield upon clutch overload permitting said first member to rotate with respect to said intermediate member and separate said interposer from between said first and said intermediate member, thereby allowing said first resilient means to move said intermediate member axially to a position at which said teeth disengage, said interposer being mounted for pivotal movement with respect to said first member, and means to pivot said interposer from behind said intermediate member while the clutch is rotating to disengage the clutch.

2. The clutch of claim 1 and means to reengage the clutch by axially moving said intermediate member to a position at which said teeth engage, and upon first engagement of said teeth said spring means first yields beyond a predetermined point and then relaxes to another given point as said teeth begin driving.

3. An overrunning clutch capable of being reengaged while operating under full rated load comprising a coaxial first member; intermediate second member; and third member, said second member being axially movable with respect to said first and third members; engagable teeth on said second and third members to drivingly connect the same; interposer means movably mounted on said first member and engagable with said second member to hold said second member in an axial position such that said teeth are engaged; abutment means movable into the rotational path of said interposer means as they rotate as a unit with said first member, to move said interposer means with respect to said first member from the second member-interposing position to enable said second member to axially move and thereby manually disengage the teeth; and resilient means establishing a drive connection between said first and second members, and cooperating with said interposer means to form a torque responsive release for said teeth, and also forming a shock absorber when the teeth of said second and third members are reengaged by axial movement of said second member.

4. In an overrunning clutch having a first rotary member, a second intermediate rotary member and a third rotary member, said members being coaxial, and coupling elements to drivingly connect said second and third members; the improvement comprising first resilient means reacting on said first and second members and establishing a drive connection therebetween which provides for limited rotational relative motion between said first and second members; means mounting said second member for axial movement between a first axial position at which said coupling elements are engaged and a second axial position at which said coupling elements are disengaged, second resilient means in addition to said first resilient means, for axially urging said second member to said second axial means including an interposer engaged by said second member for retaining said second member in its said first axial position against the yielding opposition of said second resilient means; said first resilient means yielding in response to overload due to an excessive, connected external load and also at impact of said coupling elements when they are engaged while the coupling is operating; said second member rotationally turning with respect to said first member in response to said yielding of said first resilient means, said second member moving off said interposer on condition that said rotational turning of said second member with respect to said first member is greater than a predetermined distance in which case said second resilient means axially move said second member to its said second position to thereby disengage said coupling elements, and said first resilient means back biasing said second member when said second member is in said second position.

5. An overrunning coupling having a rotary power input member and a rotary power output member with which a load is adapted to be connected, said coupling being capable of functions (a) being manually disengaged while under normal-load operation, and (b) being automatically disengaged when the torque across the coupling exceeds a predetermined maximum, and (c) being engaged while said power input member is rotating and said power output member is connected to said load; said coupling including an intermediate member coaxial with said power input and power output members and axially movable to a first and a second respective position, teeth on said intermediate member and said power output member, said teeth being in engagement when said intermediate member is in said first axial position and disengaged when said intermediate member is in said second axial position, means biasing said intermediate member toward its second axial position, means including an interposer to retain said intermediate member in said first axial position, means connecting said interposer to said power input member for rotation with said power input member and also for displacement with respect to said power input member so that said intermediate member is allowed to move to its said second axial position by manually displacing said interposer with respect to said power input member to accomplish the above function (a), mechanical means to so displace said interposer, said intermediate member also being movable to its said second axial position due to relative rotation between said power input and intermediate members by which said interposer is rotationally displaced with said power input member and with respect to said intermediate member to accomplish the above function (b), and means including a spring reacting on said power input member and said intermediate member for drivingly connecting said input and intermediate members, said spring yielding under a predetermined driving load so that there is sufficient relative rotation to cause the above function (b), and said spring also yielding a lesser amount when the coupling is engaged as under the said function (c) to form a shock arrester for teeth-engagement.

6. The overrunning coupling of claim 5 wherein said intermediate member has a stop behind which said interposer is disposed when said intermediate member is in said first axial position, said stop binding against an edge of said interposer when said intermediate member is in its said second axial position, said spring being preloaded in a direction tending to rotate said intermediate member relative to said power input member so as to press said stop against said interposer edge when said intermediate member is in its second position, and the spring preload causing relative rotation between said power input and intermediate members when said intermediate member is moved from its second axial position to its first axial position to accomplish the said function (c) thereby returning said interposer to a position behind said stop.

7. The coupling of claim 6 wherein said spring preload offers resistance to initial relative rotation between said power input and said intermediate members as the said function (b), is taking place, and means for adjusting said spring preload to set the torque at which the coupling automatically disengages.

8. An overruning clutch comprising a coaxial first member, intermediate member and third member, said intermediate member being axially movable to a first and a second axial position, coupling elements to drivingly connect said intermediate member to said third member when said intermediate member is in said first axial position, means including a spring drivingly connecting said first member with said intermediate member so that said spring experiences the torque across first and intermediate members resulting in limited relative rotation therebetween upon clutch engagement and overload respectively, an interposer between said first member and said intermediate member and holding said intermediate member in its said first axial position until said relative rotation against the yielding spring is large enough for said intermediate member to slip off of said interposer, means then operative to axially move said intermediate member to said second axial position at which said elements become decoupled, and means for reengaging said members, said reengaging means providing an axial force on said intermediate member and moving said intermediate member to said first axial position with said spring providing a rotational component of force acting on said first and said intermediate members which rotates said intermediate member to a position that said interposer is located between said intermediate member and said first member to retain said intermediate member in said first axial position.

9. In an overrunning clutch having a first rotary member, a second intermediate rotary member and a third rotary member, said members being coaxial, and coupling elements to drivingly connect said second and third members; the improvement comprising first resilient means reacting on said first and second members and establishing a drive connection therebetween which provides for a limited rotational relative motion between said first and second members; means mounting said second member for axial movement between a first axial position at which said coupling elements are engaged and a second axial position at which said coupling elements are disengaged; second resilient means axially urging said second member to said second axial position; means including an interposer engaged by said second member for retaining said second member in its said first axial position against the yielding opposition of said second resilient means; said first resilient means yielding in response to overload due to an excessive, connected external load and also at impact of said coupling elements when they are engaged while the clutch is operating; said second member rotationally turning with respect to said first member in response to said yielding of said first resilient means, said second member moving off said interposer on condition that said rotational turning of said second member with respect to said first member is greater than a predetermined amount in which case said second resilient means axially move said second member to its said second position to thereby disengage said coupling elements, said interposer being movably mounted relative to said second member; and manually operable means to disconnect said coupling elements in the absence of an overload condition by moving said interposer from behind said second member and allowing said second resilient means to move said second member to its said second axial position.

10. In an overrunning clutch having a first rotary member, a second intermediate rotary member and a third rotary member, said members being coaxial, and coupling elements to drivingly connect said second and third members; the improvement comprising first resilient means reacting on said first and second members and establishing a drive connection therebetween which provides for a limited rotational relative motion between said first and second members; means mounting said second member for axial movement between a first axial position at which said coupling elements are engaged and a second axial position at which said coupling elements are disengaged; second resilient means axially urging said second member to said second axial position; means including an interposer engaged by said second member for retaining said second member in its said first axial position against the yielding opposition of said second resilient means; said first resilient means yielding in response to overload due to an excessive, connected external load and also at impact of said coupling elements when they are engaged while the clutch is operating; said second member rotationally turning with respect to said first member in response to said yielding of said first resilient means, said second member moving off said interposer on condition that said rotational turning of said second member with respect to said first member is greater than a predetermined amount in which case said second resilient means axially move said second member to its said second position to thereby disengage said coupling elements; and means to engage said coupling elements while said first and second members are rotating by exerting an axial force on said second member which moves said second member to its said first axial position.

11. The overrunning clutch of claim 10 wherein said first resilient means include a preloaded spring, and means to adjust the preload of said spring to alter the overload rating of the clutch and also to trim the clutch.

References Cited in the file of this patent
UNITED STATES PATENTS

| | | |
|---|---|---|
| 1,879,486 | Rancke | Sept. 27, 1932 |
| 1,985,242 | De Back | Dec. 25, 1934 |
| 2,232,545 | Lum | Feb. 18, 1941 |
| 2,376,925 | Lavin | May 29, 1945 |
| 2,808,706 | Updegraff | Oct. 8, 1957 |

UNITED STATES PATENT OFFICE
CERTIFICATE OF CORRECTION

Patent No. 3,103,999                          September 17, 1963

Jacob Rabinow et al.

It is hereby certified that error appears in the above numbered patent requiring correction and that the said Letters Patent should read as corrected below.

Column 5, line 27, after "axial" insert -- position; --.

Signed and sealed this 7th day of April 1964.

(SEAL)
Attest:
ERNEST W. SWIDER

Attesting Officer

EDWARD J. BRENNER

Commissioner of Patents